US010793052B1

(12) United States Patent
Rafuse

(10) Patent No.: US 10,793,052 B1
(45) Date of Patent: Oct. 6, 2020

(54) STRAP WINCH COVER

(71) Applicant: John L. Rafuse, Antrim, NH (US)

(72) Inventor: John L. Rafuse, Antrim, NH (US)

( * ) Notice: Subject to any disclaimer, the term of this patent is extended or adjusted under 35 U.S.C. 154(b) by 12 days.

(21) Appl. No.: 16/355,715

(22) Filed: Mar. 16, 2019

(51) Int. Cl.
*B60P 7/08* (2006.01)

(52) U.S. Cl.
CPC ......... *B60P 7/0869* (2013.01); *B60P 7/0846* (2013.01); *B60P 7/0815* (2013.01)

(58) Field of Classification Search
CPC ..... B60P 7/0869; B60P 7/0846; B60P 7/0815; B65D 85/04; B65D 85/676
USPC .......... 410/96, 97, 100, 103, 156; 24/68 CD, 24/712, 715.3; 383/61.4, 72, 84, 902
See application file for complete search history.

(56) References Cited

U.S. PATENT DOCUMENTS

| | | | | |
|---|---|---|---|---|
| 4,382,736 A * | 5/1983 | Thomas | ................... | B60P 7/083 410/100 |
| 6,290,440 B1 * | 9/2001 | DiViccaro | ............. | B60P 7/0823 410/101 |
| 7,165,294 B2 * | 1/2007 | Surdam | ................... | B60P 7/083 24/68 CD |
| 7,431,548 B2 * | 10/2008 | Acton | ................... | B60P 7/0807 410/103 |
| 2016/0107562 A1 * | 4/2016 | Phelan, Jr. | ............ | B60P 7/0853 410/100 |

* cited by examiner

*Primary Examiner* — Stephen T Gordon
(74) *Attorney, Agent, or Firm* — Luis Figarella

(57) ABSTRACT

A weather proof cover for a strap winch that is mounted on a truck bed or flat trailer. The cover is capable of protecting the strap winch assembly from dust, dirt and moisture, while remaining securely attached to the assembly during transport.

12 Claims, 6 Drawing Sheets

STRAP WINCH COVER

PATENTS CITED

The following documents and references are incorporated by reference in their entirety, Eisman (U.S. Pat. No. D393,504), LeCompte (U.S. Pat. No. 3,704,738), Meigs (U.S. Pat. No. 4,367,993), Drinkhorn (U.S. Pat. No. 7,464,916), and Booher (U.S. Pat. Nos. 7,374,379 and 8,757,945)

FIELD OF THE INVENTION

The present invention relates in general to weatherproof covers for mechanical winches, and specifically to a weatherproof cover for a strap winch cover like those used to secure cargo on the flatbed of a truck.

DESCRIPTION OF THE RELATED ART

Trucking is an economical way to transport relatively large loads of commodities, particularly those not suitable to be shipped as loose packages. These and other commodities are generally transported on flatbed carriers such as trucks, semi-trailers, and full-trailers to move these goods on roads and highways. In order to maintain these loads on the flatbed trailers, binders, or straps under high tension must be used to hold the loads fixed on the truck beds during the transportation mode. For this purpose tie-down devices are used in the form of a plurality of winches that are selectively mounted on a side bar rail which is attached to the bottom or side of one side of the vehicle bed. Typically, the winch utilizes a ratchet and cam mechanism that is selectively disengaged from the ratchet so that when one end of the strap is inserted into the winch and passed over the cargo with the opposite end of the strap being directly fixed to the opposite side of the trailer bed. The strap is pulled tight to engage the load. When the desired tension is obtained, the cam re-engages the ratchet to prevent the strap from further unwinding.

During inclement weather, the straps get wet or otherwise contaminated (sand, mud, dirt) while in their stored condition (i.e. within the winch). When the temperature drop is sufficient to freeze water, a compliant wet strap becomes a frozen steel cable. Unfortunately, since the strap winches are located below the truck bed, and attached by it from the top, simply wrapping the strap winch (as is done with cable winches) is not enough.

What is needed, is a way to weather proof the strap winch while it is mounted on the vehicle.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

In one aspect the invention is about a cover for a strap type winch installed on a flatbed truck or trailer comprising an enclosure forming a single cavity, said enclosure having a single opening capable of engulfing the body of a strap winch so as to enclose the axle, ratchet, winding components, strap and portions of the mounting bracket of said winch, said opening having cinching components capable of closing said opening around said winch bracket, a flap attached to said enclosure, said flap having a width wide enough to cover said enclosure opening, while at the same time being capable of fitting through said winch bracket's internal width and complementary securing components along the distal end of said flap and along the external surface of said enclosure. In another aspect said cinching component is comprised of at least one of the components from the group of: string, rope, cable, elastic, rubber band, rubber coil, scrunchy, bungee cord or similar and said closing component is comprised of at least one of the components from the group of: snaps, snap buttons, hooks and loops, VELCRO, buckles, latches, buttons/buttonholes, buttons/cables or any other such suitable securing component. In yet another aspect, a sleeve or side pocket running along a side of said cover or enclosure. In another aspect, a bungee cord or other rope inserted along said sleeve or side pocket. In yet another aspect, an anti-theft sleeve, loop, bracket or clip attached to said enclosure.

In one aspect, the invention is about a method for using a cover for a strap type winch installed on a flatbed truck or trailer, said method comprising placing an enclosure forming a single cavity, said enclosure having a single opening capable of engulfing the body of a strap winch so as to enclose the axle, ratchet, winding components, strap and portions of the mounting bracket of said winch, said opening having cinching components capable of closing said opening around said winch bracket, a flap attached to said enclosure, said flap having a width wide enough to cover said enclosure opening, while at the same time being capable of fitting through said winch bracket's internal width and complementary securing components along the distal end of said flap and along the external surface of said enclosure. In another aspect, said cinching component is comprised of at least one of the components from the group of: string, rope, cable, elastic, rubber band, rubber coil, scrunchy, bungee cord or similar; and said closing component is comprised of at least one of the components from the group of: snaps, snap buttons, hooks and loops, VELCRO, buckles, latches, buttons/buttonholes, buttons/cables or any other such suitable securing components. In another aspect, said a sleeve or side pocket running along a side of said cover or enclosure. In yet another aspect, a bungee cord, rope or cable is inserted along said sleeve or side pocket.

Other features and advantages of the present invention will become apparent upon examining the following detailed description of an embodiment thereof, taken in conjunction with the attached drawings.

DETAILED DESCRIPTION OF THE PREFERRED EMBODIMENT

Figure 1:
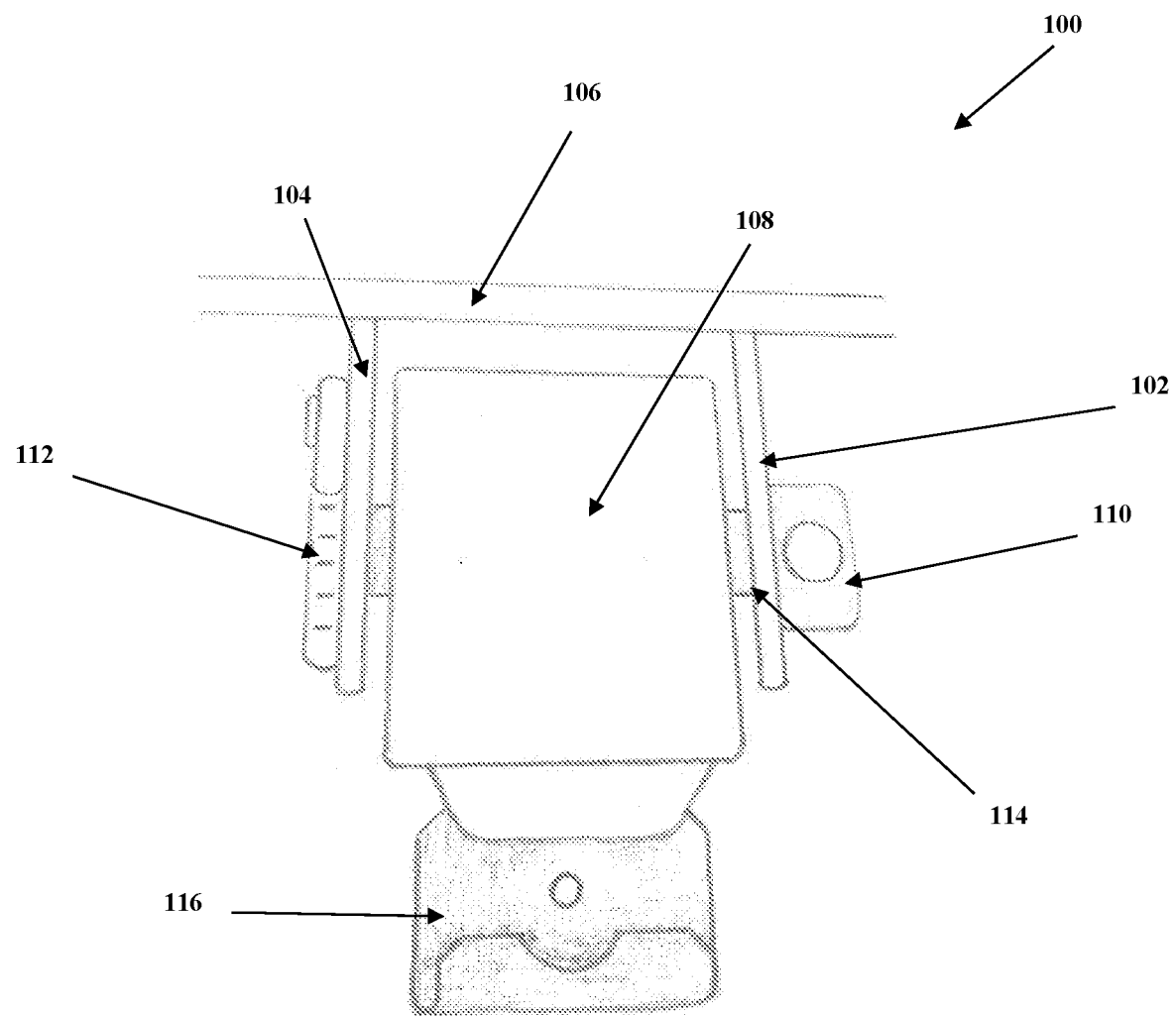
FIG. 1 shows an illustration of a strap winch, according to the prior art.

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

Simplifications or omissions may be made to avoid obscuring the purpose of the section. Such simplifications or omissions are not intended to limit the scope of the present invention. All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

As used in the specification and claims, the singular forms "a", "an" and "the" include plural references unless the context clearly dictates otherwise. For example, the term "a transaction" may include a plurality of transaction unless the context clearly dictates otherwise. As used in the specification and claims, singular names or types referenced include variations within the family of said name unless the context clearly dictates otherwise.

Certain terminology is used in the following description for convenience only and is not limiting. The words "lower," "upper," "bottom," "top," "front," "back," "left," "right" and "sides" designate directions in the drawings to which reference is made, but are not limiting with respect to the orientation in which the modules or any assembly of them may be used.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Figure 2:
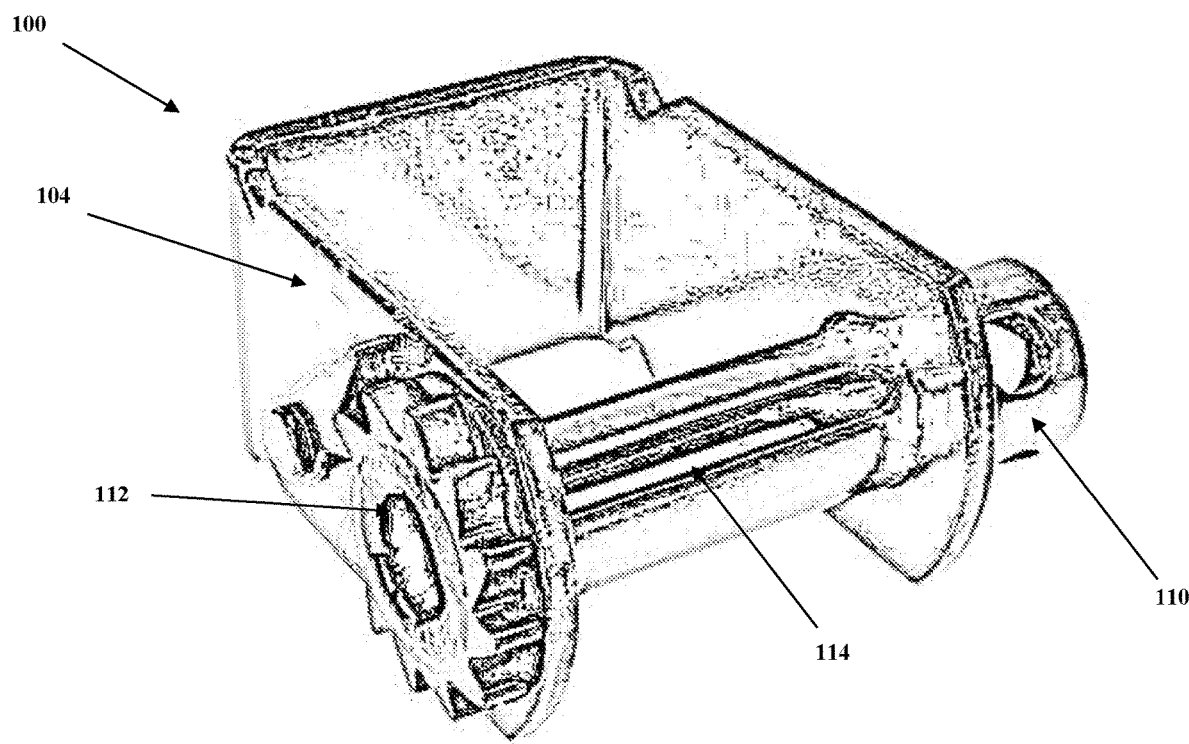
FIG. 2 shows the strap winch on its side, according to the prior art.

Referring to FIGS. 1-2, we see an illustration of a strap winch 100, according to the prior art. Such strap winches are used by truck operators to 'strap' down loads, particularly in vehicles such as flat bed truck/trailers. When the strap (a 40 ft. trailer may require 10 to 18 straps to securely tie down the load) are wet and frozen, they become hard to operate. Similarly, when dirty, they may mark or mar the load. To prevent the above, many truck operators remove the straps from the winches in the underside of the trailer (by manually unwinding them, a time consuming process), store them in the heated cabin and then re-wind take them out while strapping the load (and re-winding strap portions on the winch. Needless to say, the above costs time in order to take them out and re-install them.

Time is important not only because of effort and efficiency, but because truckers are limited to 11 hrs. driving OR 14 hours on duty by the Dept. of Transportation (DOT). Thus a trucker spending an extra hour tying down the load and/or removing/installing straps, potentially gives up an hour of driving. Yes, keeping the straps malleable and clean has direct benefits.

When used in a truck or flatbed trailer, the strap winch 100 is usually mounted by attaching 104 to the bottom of the flatbed, where a mounting bracket 106 is either fixed or formed as a slot within which the winch 100 may slide sideways. The strap 108 is wound around a center axle 114 supported by a bracket 102. The axle 114 has a ratchet 112 on one side and a winding component 110 on the other, so that the strap 108 (ending at the strap clip 116) may be loosened and tightened as required.

In addition to keeping the strap clean, it must be noted that at times, the ratchet 112 lock may fail (or not be properly engaged), resulting in the strap 'unraveling' (particularly because of the action of the wind as well as gravity on said strap clip 116). The applicant has seen trucks 'trailing' a strap (with the resulting risk of impact to other vehicles). At other times, the trailing strap proceeds to be engaged with the read axle of the trailer/flatbed, resulting in breakage of components.

As mentioned above, one of the primary problems when using strap winches comes with the use of straps that have been wetted and/or dirtied beforehand, particularly in freezing conditions. During those conditions, a wet strap may behave like a solid, forcing the operator to spend significant extra time trying to tie down his load.

As seen in LeCompte (U.S. Pat. No. 3,704,738), the problem has been solved in naval applications by 'covering' the capstan with a cover. In fact, this is the common approach for cable winches (commonly found in the front of 4×4 vehicles such as Jeeps), that is, to place a cover over the whole arrangement, with the opening of the cover pointing down.

The primary challenge of these previous weather proofing methods when applied to a strap winch, is being able to protect from the elements a strap winch that is installed on the truck or trailer. This is because when installed, a strap winch is installed/held from the top 100. Thus 'simply' placing a bag around the strap winch would result in having a 'rain collecting bucket' with an open end facing up.

Figure 3:
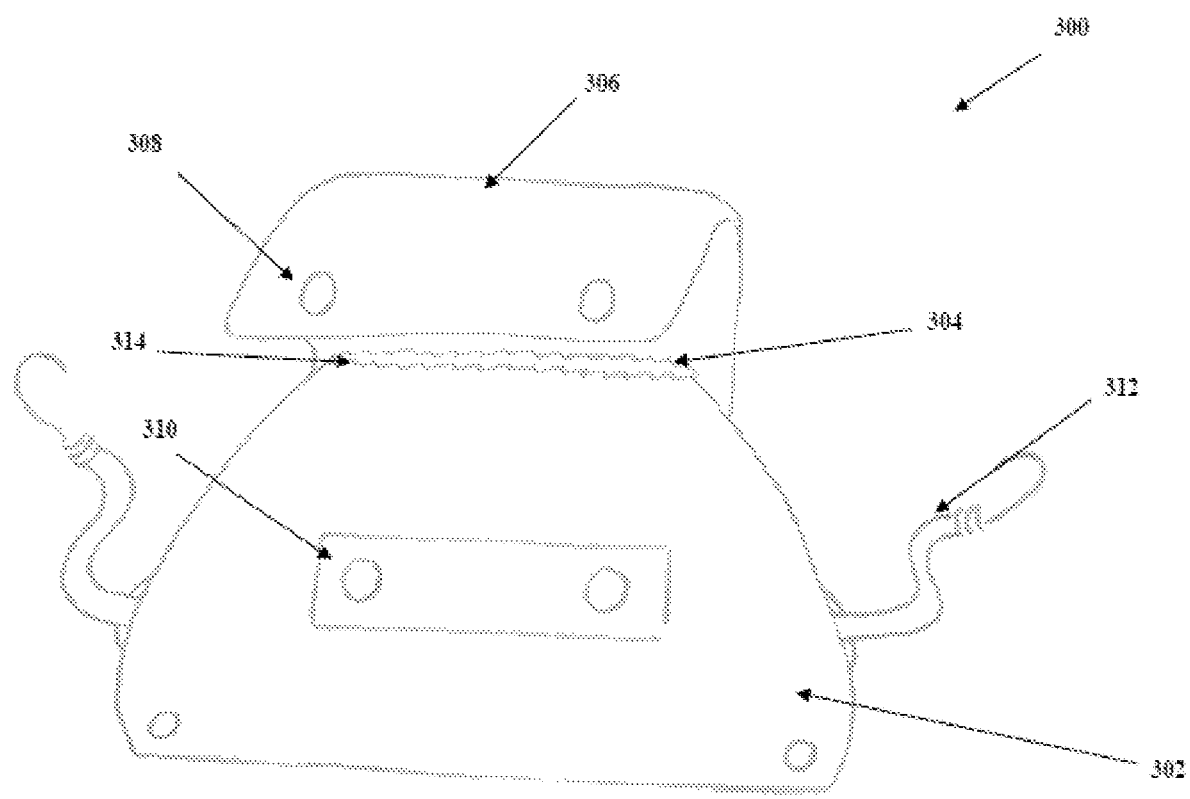
FIG. 3 shows an illustration of a front view of a strap winch cover, according to an exemplary embodiment of the invention.

What is proposed FIG. 3, is a strap winch cover 300 comprised of a weatherproof enclosure 302 capable of completely surrounding a strap winch 100. In one embodiment, it would have a single opening 304 on the top part, this single opening 304 would have a cinchable component 314 (say a string, rope, elastic, cable, etc.) incorporated into the material forming the rim of said opening 304. The installer could expand/loosen said cable, increasing the size of the opening 304 so as to engulf the winch 100, then cinch it around the bracket 102, thus protecting from the elements the complete winch assembly having the strap 108.

In an alternate embodiment, the opening 304 has an elastic component (rubber band, rubber coil, scrunchy, bungee cord, etc.) incorporated around the rim of the opening 304, so that the cinching of the opening occurs once the opening is released by the installer/operator. Of course, any opening left 'facing up' runs the risk of becoming a 'rain bucket'. To prevent this, the cover has a flap 306 designed to go over the opening while simultaneously being able to fit through the gap formed by the bracket 102. In short, by making the flap slightly wider than said gap, it will proceed to cover the opening when laid through said gap, while simultaneously being held in place by said bracket 102.

A complementary closing component 308/310 is installed at/near one end of the flap 306, to accomplish a number of things. First, it prevents the flap 306 from randomly moving with the wind as the vehicle moves. Second, it allows for the portion covering the opening 304 to 'snuggly' fit over it, improving it's weatherproofing capabilities. Said closing components 308/310 may be comprised of snaps (also called snap buttons), hooks and loops (also known as VELCRO), buckles, latches, buttons/buttonholes, buttons/cables or any other such suitable securing method. In this fashion, once secured, the flap 306 remains over the opening 304 while minimizing the entry of any dust, dirt or moisture FIG. 3.

Figure 4:
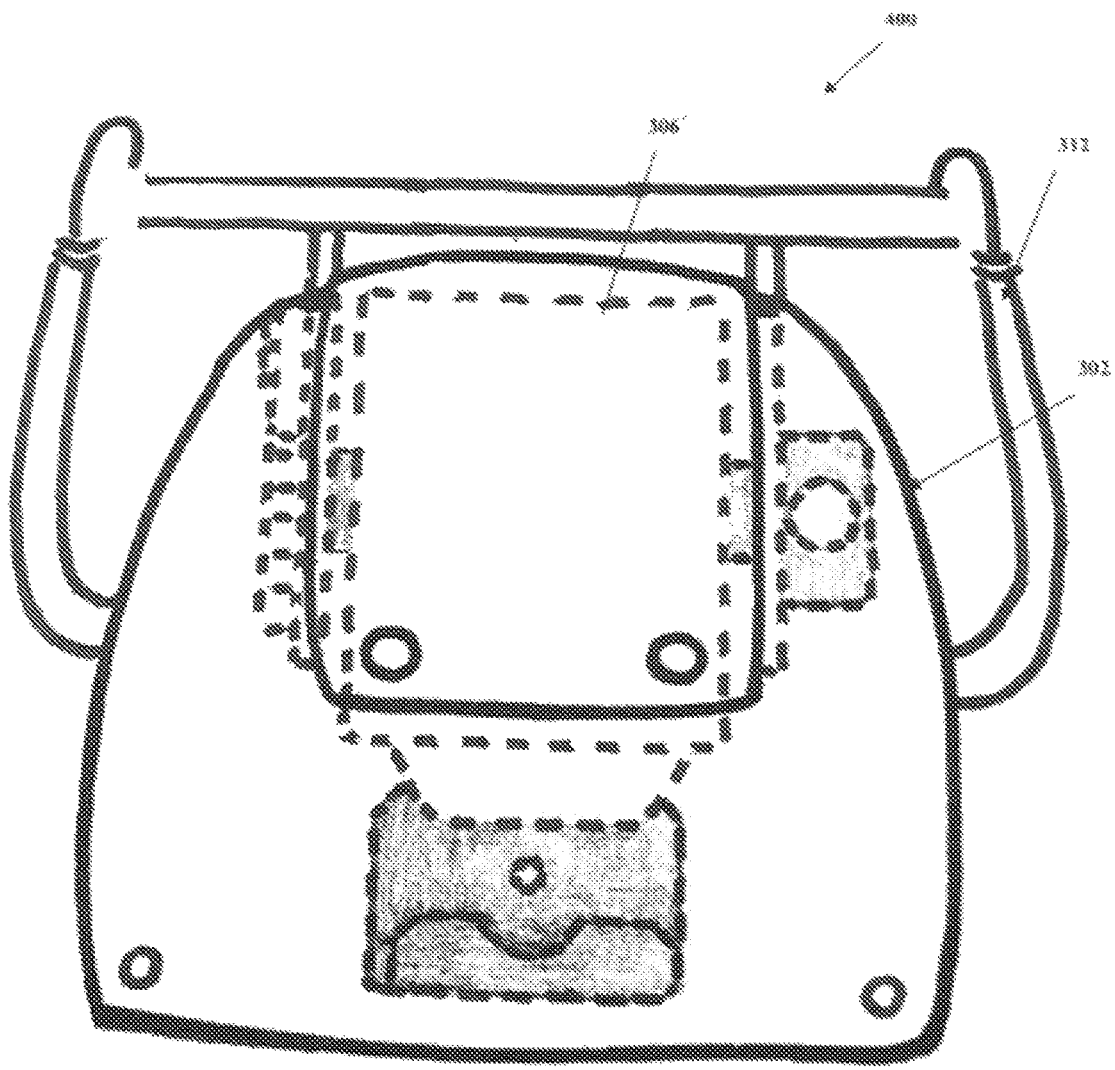
FIG. 4 shows an illustration of a front view of a strap winch cover installed over a strap winch, according to an exemplary embodiment of the invention.
Figure 5:
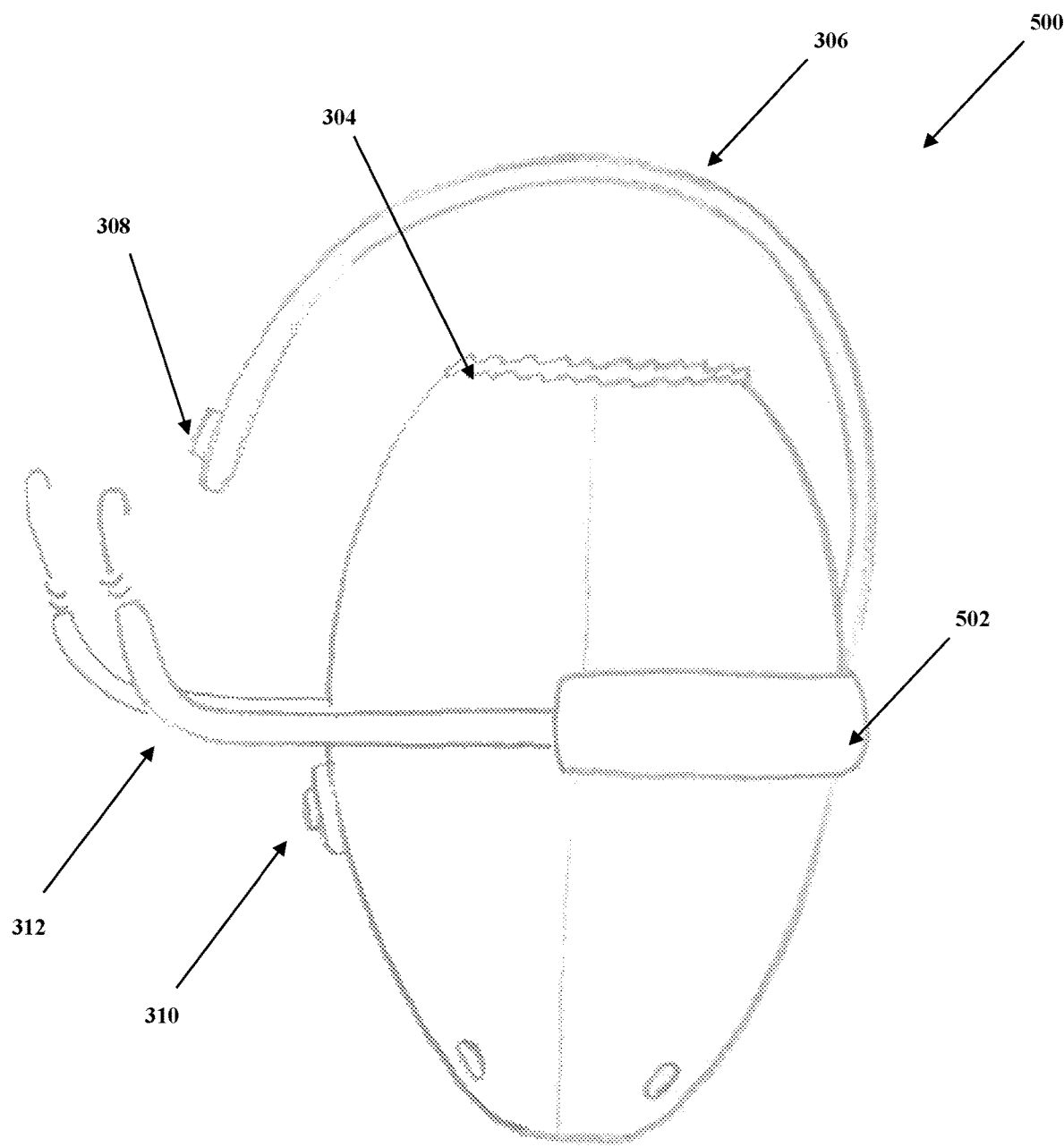
FIG. 5 shows an illustration of a side view of a strap winch cover, according to an exemplary embodiment of the invention.
Figure 6:
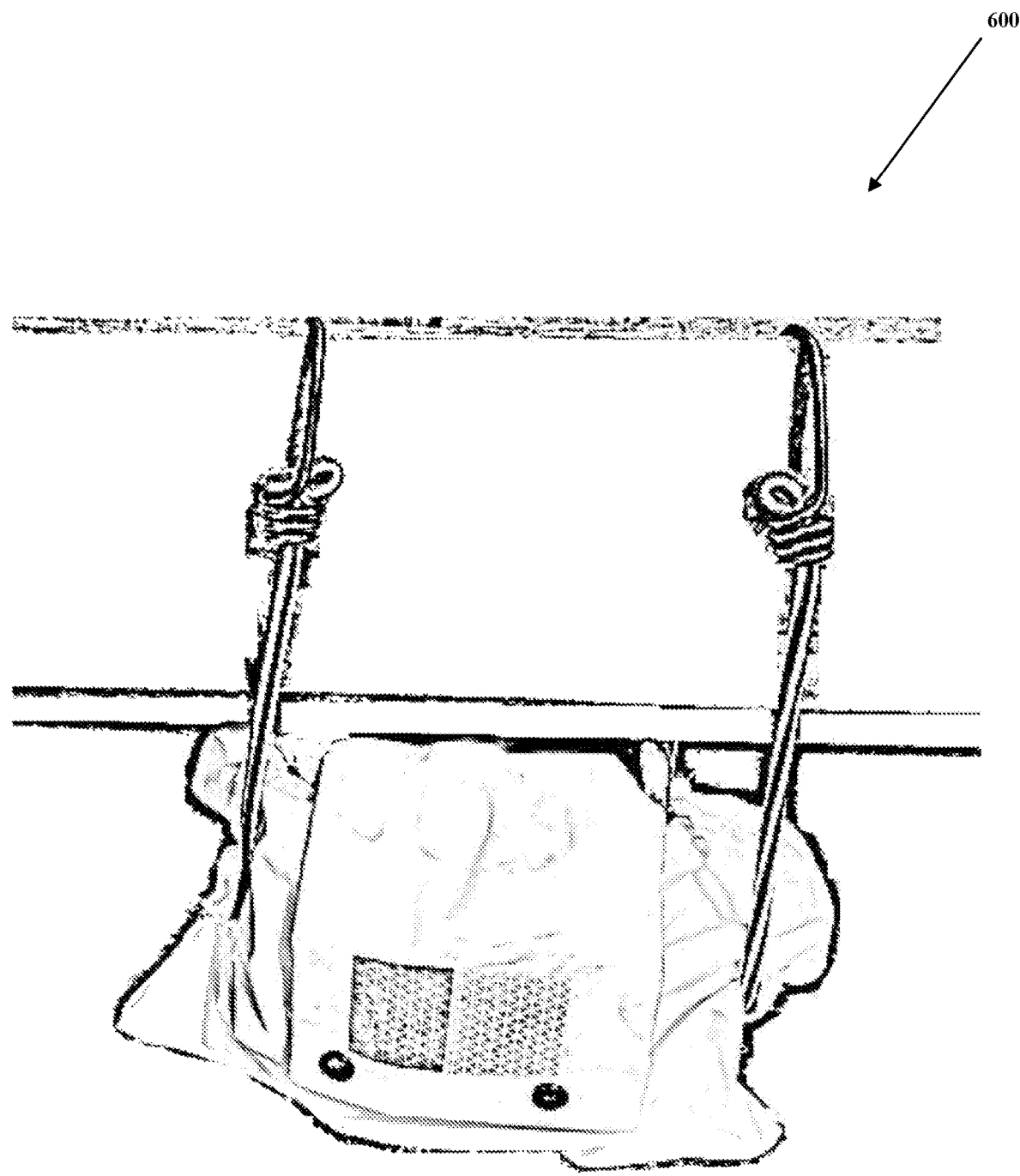
FIG. 6 shows the winch covered by the enclosure while installed on a flatbed trailer, according to an exemplary embodiment of the invention.

FIG. 4 illustrates an enclosure 302 installed over a strap winch 100 (400) in a proposed embodiment of the invention. It would be convenient for the operator not to have to completely remove the winch cover when a load is covered. In such cases FIG. 5, a separate bungee cord 312 (or similar elastic component) would be fitted 500 along a sleeve or side pocket 502 running along a side or other portion of the cover or enclosure 302, so that the cord 312 may be hooked onto the vehicle or winch chassis, ensuring that the enclosure 302 remains with the vehicle, FIG. 6.

In an alternate embodiment, a similar sleeve or similar loop/bracket/clip could be used to secure the enclosure 302 to the vehicle with a cable and lock to prevent unauthorized removal (i.e. theft). The enclosure itself may be built of any suitable material, including natural or manmade fibers (cotton, polyester, plastic, denim) in one or many plies, including having water resistant and/or waterproof layers, and/or being treated with water-repellent products such as SCOTCHGARD, silicone sprays, etc. One or more safety reflectors 600 may be attached to parts of the unit to increase safety.

CONCLUSION

In concluding the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

The invention claimed is:

1. A cover for a strap type winch installed on a flatbed truck or trailer comprising;
    an enclosure forming a single cavity, said enclosure having a single opening capable of engulfing a body of a strap winch so as to enclose elements of the strap winch including an axle, ratchet, winding components, strap and portions of a mounting bracket of said winch;
    said opening having cinching components capable of closing said opening around said winch bracket;
    a flap attached to said enclosure, said flap having a width wide enough to cover said enclosure opening, while at the same time being capable of fitting through said winch bracket's internal width; and
    complementary securing components along a distal end of said flap and along the external surface of said enclosure.

2. The cover of claim 1 wherein;
    said cinching components are comprised of at least one of the components from the group of:
    string, rope, cable, elastic, rubber band, rubber coil, scrunchy, or bungee cord; and
    said securing components are comprised of at least one of the components from the group of:
    snaps, snap buttons, hooks and loops, VELCRO, buckles, latches, buttons/buttonholes, or buttons/cables.

3. The cover of claim 2 further comprising;
    a sleeve or side pocket running along a side of said cover or enclosure.

4. The cover of claim 3 further comprising;
    bungee cord, rope or cable inserted along said sleeve or side pocket.

5. The cover of claim 4 further comprising;
    an anti-theft sleeve, loop, bracket or clip attached to said enclosure.

6. The cover of claim 1 further comprising;
    a sleeve or side pocket running along a side of said cover or enclosure.

7. The cover of claim 6 further comprising;
    a bungee cord, rope or cable inserted along said sleeve or side pocket.

8. The cover of claim 7 further comprising;
    an anti-theft sleeve, loop, bracket or clip attached to said enclosure.

9. A method for using a cover for a strap type winch installed on a flatbed truck or trailer, said method comprising;
    placing an enclosure forming a single cavity, said enclosure having a single opening capable of engulfing a body of a strap winch so as to enclose elements of the strap winch including an axle, ratchet, winding components, strap and portions of a mounting bracket of said winch, said opening having cinching components capable of closing said opening around said winch bracket, a flap attached to said enclosure, said flap having a width wide enough to cover said enclosure opening, while at the same time being capable of fitting through said winch bracket's internal width and complementary securing components along a distal end of said flap and along the external surface of said enclosure.

10. The method of claim 9 wherein;
said cinching components are comprised of at least one of the components from the group of:
string, rope, cable, elastic, rubber band, rubber coil, scrunchy, or bungee cord; and
said securing components are comprised of at least one of the components from the group of:
snaps, snap buttons, hooks and loops, VELCRO, buckles, latches, buttons/buttonholes, or buttons/cables.

11. The method of claim 10 wherein;
a sleeve or side pocket running along a side of said cover or enclosure.

12. The method of claim 11 further comprising;
a bungee cord, rope or cable inserted along said sleeve or side pocket.

\* \* \* \* \*